(12) United States Patent
Singh et al.

(10) Patent No.: US 10,456,741 B2
(45) Date of Patent: Oct. 29, 2019

(54) COMPRESSED GAS DRYER WITH ENERGY HARVESTING, AND METHOD

(71) Applicant: INGERSOLL-RAND COMPANY, Davidson, NC (US)

(72) Inventors: Jeetendra Singh, Ahmedabad (IN); Lalitkumar Jamnadas Vaishnav, Gujarta (IN)

(73) Assignee: Ingersoll-Rand Company, Davidson, NC (US)

( * ) Notice: Subject to any disclaimer, the term of this patent is extended or adjusted under 35 U.S.C. 154(b) by 164 days.

(21) Appl. No.: 14/862,498

(22) Filed: Sep. 23, 2015

(65) Prior Publication Data

US 2017/0080382 A1 Mar. 23, 2017

(51) Int. Cl.
*B01D 53/26* (2006.01)
*F25B 29/00* (2006.01)

(52) U.S. Cl.
CPC ............ B01D 53/265 (2013.01); *B01D 53/26* (2013.01); *F25B 29/003* (2013.01)

(58) Field of Classification Search
CPC ..... B01D 53/26; B01D 53/265; F25B 29/003; F26B 21/086; F28D 2021/0038; F28D 9/0093
See application file for complete search history.

(56) References Cited

U.S. PATENT DOCUMENTS

| | | | | |
|---|---|---|---|---|
| 4,761,967 A | * | 8/1988 | Sumikawa | ............ B60H 1/005 165/140 |
| 5,107,919 A | * | 4/1992 | Basseen | ............ B01D 53/265 165/113 |
| 5,357,764 A | * | 10/1994 | Dickman | ............ B01D 5/006 62/121 |
| 5,398,497 A | * | 3/1995 | Suppes | ............ B01D 53/1481 60/39.511 |
| 5,845,505 A | * | 12/1998 | Galus | ............ B01D 53/265 62/95 |
| 5,983,651 A | | 11/1999 | Huang | |
| 7,043,934 B2 | | 5/2006 | Radermacher et al. | |
| 7,954,335 B2 | | 6/2011 | Hill et al. | |

(Continued)

FOREIGN PATENT DOCUMENTS

| | | | | |
|---|---|---|---|---|
| DE | 102004051435 B3 | * | 6/2006 | ............ B60T 17/004 |
| DE | 102004051435 B3 | * | 6/2006 | ............ B60T 17/004 |

(Continued)

OTHER PUBLICATIONS

"Machine Translation of DE102004051435, Meyer et al., Jun. 2006".*

*Primary Examiner* — Frantz F Jules
*Assistant Examiner* — Martha Tadesse
(74) *Attorney, Agent, or Firm* — Taft Stettinius & Hollister LLP

(57) ABSTRACT

A drying system for compressed gas includes a fluid conduit, a cooler, and a precooler. The fluid conduit receives a flow of compressed gas to be cooled by the cooler and precooled by the precooler. The precooler has a gas-to-gas heat exchange section and a gas-to-liquid heat exchange section. A liquid-gas separator is coupled with the fluid conduit, and with a gas line and a liquid line. The gas line conveys gas to the gas-to-gas heat exchange section and the liquid line conveys liquid condensate to the gas-to-liquid heat exchange section.

20 Claims, 2 Drawing Sheets

(56) References Cited

U.S. PATENT DOCUMENTS

| | | |
|---|---|---|
| 8,006,503 B2 | 8/2011 | Collins et al. |
| 8,425,673 B2 | 4/2013 | Burke |
| 2011/0110795 A1* | 5/2011 | Van Campfort .......... F16T 1/00 417/53 |
| 2013/0035534 A1* | 2/2013 | Favilli .................. B01D 53/002 585/812 |
| 2013/0175003 A1 | 7/2013 | Bergh |

FOREIGN PATENT DOCUMENTS

| | | |
|---|---|---|
| EP | 1015825 | 4/2007 |
| WO | 2011087505 | 7/2011 |

* cited by examiner

COMPRESSED GAS DRYER WITH ENERGY HARVESTING, AND METHOD

TECHNICAL FIELD

The present disclosure relates generally to drying compressed gas, and more particularly to cooling compressed gas for drying via exchanging heat with liquid condensate formed during the compressed gas drying process.

BACKGROUND

Compressed gas, notably air, is used for innumerable purposes. Well-known applications include pneumatically operated tools, compressed air cleaning mechanisms, and inflation pumps. Ambient air commonly serves as a source of air to be compressed. Ambient air commonly contains a significant quantity of water vapor. To avoid introducing humid air or liquid condensate into machinery, tools or storage tanks, it is typically desirable to remove moisture. Cooling compressed air down to or below its dew point enables water to be removed. Despite a variety of practical strategies, there remains a need for continued improvement in this technical area.

SUMMARY

A drying system for compressed gas includes a fluid conduit, a cooler, and a precooler. The fluid conduit receives a flow of compressed gas to be cooled by the cooler and precooled by the precooler. The precooler has a gas-to-liquid heat exchange section. A liquid-gas separator is coupled with the fluid conduit. A gas line conveys gas from the liquid-gas separate to the gas-to-gas heat exchange section, and a liquid line conveys liquid condensate from the liquid-gas separator to the gas-to-liquid heat exchange section.

DETAILED DESCRIPTION OF THE FIGURES

Figure 1:
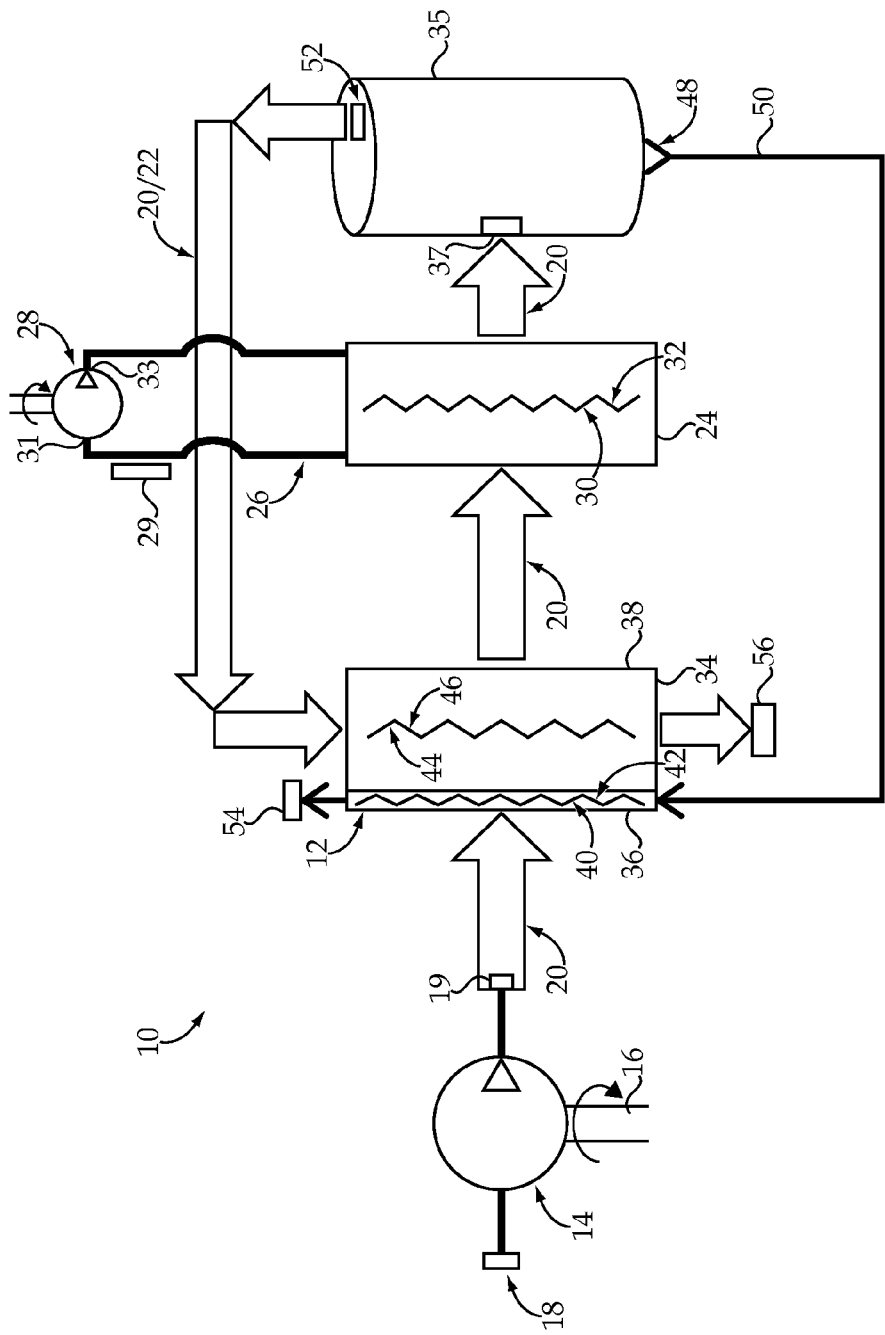
FIG. 1 is a diagrammatic view of a compressed gas system according to one embodiment.

For the purposes of promoting an understanding of the principles of the Compressed Gas Dryer With Energy Harvesting, And Method, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, there is shown a compressed gas system 10 that includes a drying system or dryer 12, according to one embodiment. System 10 includes a compressed gas supply or compressor 14, in the illustrated embodiment powered by a rotating shaft 16 that will be understood to be coupled with an engine, electric motor, or other source of power. In alternative versions, compressed gas supply 14 could include a compressed gas container or storage vessel. A filtered gas inlet 18 is shown associated with compressor 14, and will be understood to supply filtered air or another gas that is to be compressed. System 10 further includes a fluid conduit 20 having an inlet for compressed gas 19 that is structured to receive a flow of compressed gas from compressor 14. System 10 further includes a cooler 24 for cooling the compressed gas, and a precooler 34 for precooling the compressed gas. Each of cooler 24 and precooler 34 may be understood to be coupled with or include parts of fluid conduit 20, and be in heat transference contact with fluid conduit 20. It should also be appreciated that directional arrows are used in FIG. 1 to depict fluid conduit 20, and also represent the structure such as a pipe, hoses, etc., that contain and convey compressed gas. As will be further apparent from the following description, system 10 is structured for high efficiency drying of compressed gas by way of a unique energy harvesting strategy. Also shown in FIG. 1 is a gas outlet 56 from conduit 20 and system 10, structured to discharge compressed gas having been dried via dryer 12 to a pneumatically operated tool, a nozzle, or to a compressed gas storage tank by way of example.

As noted above, system 10 includes cooler 24 and precooler 34. Incoming compressed gas is conveyed via fluid conduit 20 through precooler 34 so as to initially reduce a temperature of the compressed gas. The compressed gas is then conveyed through cooler 24 so as to subsequently reduce temperature of the compressed gas. Precooler 34 may include a gas-to-gas heat exchange section 38 and a gas-to-liquid heat exchange section 36. Each of sections 36 and 38 has a first heat exchange surface 40 and 44, respectively, exposed to the flow of compressed gas, and a second heat exchange surface 42 and 46, respectively. It can be seen from FIG. 1 that gas-to-gas heat exchange section 38 and gas-to-liquid heat exchange section 36 may be positioned such that section 36 is upstream of section 38, in reference to the direction of incoming compressed gas flow.

System 10 may further include a liquid-gas separator 35 that includes a separator inlet 37 fluidly connected to fluid conduit 20 to receive compressed gas from cooler 24. Separator 35 further includes a gas outlet 52, and a liquid drain outlet 48. As separator 35 is also understood to include parts of fluid conduit 20, drain outlet 48 can be understood as formed in fluid conduit 20. A gas line 22 fluidly connects gas outlet 52 to gas-to-gas section 34 such that the corresponding second heat exchange surface 46 is exposed to a flow of compressed gas from separator 35. A liquid line 50 fluidly connects drain outlet 48 to gas-to-liquid section 36, such that the corresponding second heat exchange surface 42 is exposed to a flow of liquid from separator 35. The liquid can drain under the force of gravity to section 36, be pumped, or conveyed by way of both gravity and active pumping. It can thus be seen that compressed gas flows from compressor 14 into conduit 20, is precooled via gas-to-liquid heat exchange section 36 and gas-to-gas heat exchange section 34, and is then cooled in cooler 24. From cooler 24, the cooled compressed gas, now cooled below a dew point thereof, is conveyed into liquid separator 35, structured to collect liquid condensate and output the compressed gas having been dried and the condensed liquid in separate gas line 22 and liquid line 50. It can be seen from the illustrated embodiment in FIG. 1 that gas line 22 is in fact part of and can be understood as a downstream segment of conduit 20. Conduit 20 can also be understood as having an upstream segment that extends through precooler 34 and cooler 24, between inlet 19 and inlet 37. Liquid having been conveyed via liquid line 50 through section 36 may be removed or drained from system 10 at a liquid outlet 54, after exchanging heat with the incoming compressed gas. As noted above, gas having passed through section 38 may be delivered via gas outlet 56 to a variety of other downstream devices, or to a container for storage.

A variety of different heat exchanger types could be used in precooler 34 or cooler 24. In one practical implementation strategy, each of heat exchange section 36 and heat exchange section 38 includes a primary surface heat exchanger where a solid wall extends between the corresponding first and second heat exchange surfaces. It can thus be seen from FIG. 1 that the zig-zag line upon opposite sides of which the respective heat exchange surfaces are located represents the solid wall. A corrugated surface contour of the various heat exchange surfaces might be provided, although the present disclosure is not thereby limited. Similar principles apply to the heat exchange surfaces 30 and 32 to be described in cooler 24. In alternative embodiments, a shell and tube style heat exchanger could be used, or still some other type of heat exchange configuration such as where secondary surfaces are located on heat dissipating fins or the like.

System 10 may also include a coolant loop 26 coupled with cooler 24 and structured to circulate a coolant through cooler 24. The coolant may include a conventional refrigerant that undergoes a phase change within cooler 24 to assist in cooling compressed gas impinging upon surface 30. In other embodiments, a chilled liquid or the like might be used. Cooler 24 is in heat transference contact with fluid conduit 20 and includes a first heat exchange surface 30 and a second heat exchange surface 32 as noted above. Cooler 24 may include a primary surface heat exchanger with a solid wall configured analogously to the heat exchange sections of precooler 34 in some embodiments. First heat exchange surface 30 may thus be exposed to the flow of compressed gas, and second heat exchange surface 32 exposed to a flow of refrigerant. In a practical implementation strategy, a radiator or the like 29 is coupled with coolant loop 26 to assist in dissipating heat from the circulated refrigerant. The refrigerant may be in heat exchange contact with fluid conduit 20. The refrigerant and coolant loop 26 may further be fluidly and thermally separated from liquid line 50 and from precooler 34 such that the refrigerant is heat exchange isolated from the liquid. Another way to understand this principle is that the refrigerant is not heated or cooled by way of the liquid conveyed through liquid line 50 at all. Accordingly, a temperature difference between refrigerant exiting an outlet 33 and refrigerant entering an inlet 31 of a compressor 28 coupled with coolant loop 26 may be dependent only upon, or substantially only upon, exchanging heat with the compressed gas passed through cooler 24.

Figure 2:
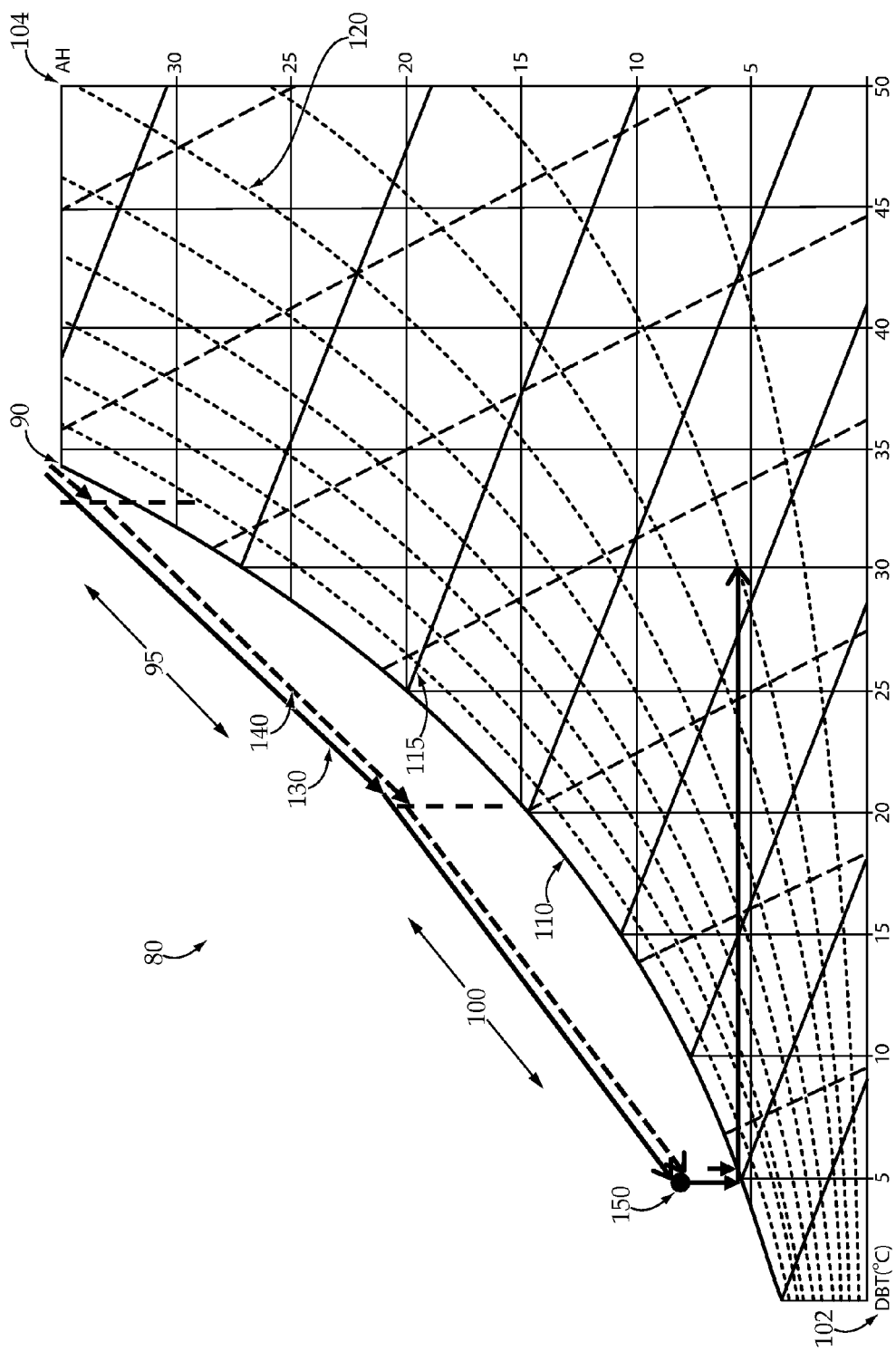
FIG. 2 is a psychrometric chart illustrating relationships among various parameters in a compressed gas system according to one embodiment.

Referring now to FIG. 2, there is shown a psychrometric chart 80 illustrating relationships among various parameters in connection with operating system 10. Along the horizontal axis 102 of chart 80 is shown dry bulb temperature (DBT) in ° C., and along the vertical axis 104 is shown absolute humidity, in units of grams per kilogram. Reference numeral 110 indicates a curve illustrating dew point temperature, reference numeral 115 identifies curves showing wet bulb temperature, and reference numeral 120 identifies curves showing relative humidity. Reference numeral 130 identifies a curve representing enthalpy in an air-to-air section 95 and an air-to-refrigerant section 100, whereas reference numeral 140 identifies a curve representing enthalpy according to the cooling process of the present disclosure. In a precooling section 90, it can be seen that the dashed line 140 represents enthalpy lower than in the existing process. Another way to understand what is depicted in FIG. 2 is a reduction in temperature of incoming compressed gas when it first encounters the cooler, having already been cooled via exchanging heat with the liquid condensate, in comparison to a design where no precooling with chilled liquid condensate occurs.

In many conventional compressed air drying systems, low temperature drain water is removed from the system as it condenses out of compressed gas being cooled, and is discarded. In one example operation according to the present disclosure, depending upon well-known variables water temperature of the liquid condensate may be several degrees C., for instance about 3° C., which will be substantially the same as the dew point temperature of the compressed air. This water can be heated at least theoretically up to the maximum rated condition of the air inlet temperature, which might be about 45° C. Accordingly, water temperature can be increased by about 42° C. in at least some instances by the heat exchange with incoming compressed air. The incoming air temperature can thus be reduced by a difference in enthalpy states between the case where no precooling is effected and the case where precooling with the chilled water is used, multiplied times the mass flow of air. It has been discovered that temperature of the incoming compressed air in such circumstances may be reduced by about 0.8° C., which may correspond to an approximately five percent reduction in refrigeration system load to achieve the aims of drying compressed air.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A drying system for compressed gas comprising:
a fluid conduit having a compressed gas inlet structured to receive a flow of compressed gas from a compressed gas supply;
a cooler for cooling the compressed gas;
a precooler for precooling the compressed gas, and including a gas-to-gas heat exchange section and a gas-to-liquid heat exchange section integrated together such that a wall extends between the gas-to-gas heat exchange section and the gas-to-liquid heat exchange section, each of the gas-to gas and gas-to-liquid heat exchange sections having a first heat exchange surface exposed to the flow of compressed gas, and a second heat exchange surface, the precooler in fluid communication with the cooler via a compressed air conduit;
a liquid-gas separator including a separator inlet fluidly connected to the fluid conduit to receive the compressed gas from the cooler, a gas outlet, and a liquid drain outlet;
a gas line fluidly connecting the gas outlet to the gas-to-gas heat exchange section, such that the corresponding second heat exchange surface is exposed to the flow of compressed gas from the liquid-gas separator; and
a liquid line fluidly connecting the liquid drain outlet to the gas-to-liquid section, such that the corresponding second heat exchange surface is exposed to a flow of a liquid from the liquid-gas separator, wherein heat is directly exchanged between the compressed gas and the liquid.

2. The system of claim 1 wherein each of the gas-to-gas and gas-to-liquid heat exchange sections includes a primary surface heat exchanger where a solid wall extends between the corresponding first and second heat exchange surfaces.

3. The system of claim 1 further comprising a coolant loop coupled with the cooler and structured to circulate a coolant through the cooler.

4. The system of claim 3 wherein the coolant includes a refrigerant, and wherein the cooler includes a first heat exchange surface exposed to the flow of compressed gas, and a second heat exchange surface exposed to a flow of the refrigerant.

5. The system of claim 4 further comprising a compressor having an outlet and an inlet to the coolant loop.

6. The system of claim 5 wherein the coolant loop is charged with the refrigerant in heat exchange contact with the fluid conduit, and is further fluidly and thermally separated from the liquid line and the precooler such that the refrigerant is heat exchange isolated from the liquid.

7. The system of claim 1 wherein the fluid conduit includes an upstream segment through the precooler and the cooler, and a downstream segment that includes the gas line.

8. The system of claim 6 wherein the gas-to-liquid heat exchange section of the precooler is positioned upstream of the gas-to-gas heat exchange section.

9. A method of drying a compressed gas comprising:
conveying incoming compressed gas through a precooler in a drying system so as to initially reduce a temperature of the compressed gas, the precooler having an integrated construction which includes a first heat exchanger and a second heat exchanger disposed on opposite sides of a wall of the integrated construction;
passing the compressed gas from the precooler through a conduit to a cooler;
conveying the compressed gas through a cooler in the drying system so as to subsequently reduce the temperature of the compressed gas;
draining liquid condensed from the compressed gas by way of the reductions in temperature from a liquid drain outlet of a fluid conduit that conveys the compressed gas through the precooler and the cooler; and
passing the condensed liquid through the first heat exchanger of the precooler such that the initial reduction in temperature occurs by way of a direct exchange of heat between the condensed liquid and the incoming compressed gas.

10. The method of claim 9 wherein the first heat exchanger includes a gas-to-liquid heat exchange section, wherein the conveying of the incoming compressed gas includes conveying the incoming compressed gas so as to contact a heat exchange surface in the gas-to-liquid heat exchange section of the precooler.

11. The method of claim 10 wherein the passing of the condensed liquid includes passing the condensed liquid so as to contact a second heat exchange surface in the gas-to-liquid heat exchange section such that heat is exchanged between the incoming compressed gas and the condensed liquid.

12. The method of claim 11 wherein the second heat exchanger includes a gas-to-gas heat exchanger section, and which further comprises discharging compressed gas from a compressed gas outlet of the drying system, and further comprising contacting the compressed gas to be discharged with another heat exchange surface in the gas-to-gas heat exchange section of the precooler so as to exchange heat with the incoming compressed gas.

13. The method of claim 11 wherein the exchange of heat with the condensed liquid occurs at an upstream location of the compressed air and the exchange of heat with the incoming compressed gas occurs at a downstream location of the compressed air.

14. The method of claim 9 wherein the conveying of the compressed gas through the cooler includes conveying the compressed gas so as to contact a heat exchange surface in the cooler, and further comprising conveying a refrigerant through the cooler so as to contact another heat exchange surface in the cooler such that heat is exchanged between the compressed gas and the refrigerant.

15. A compressed gas system comprising:
a compressed gas supply;
a dryer having a fluid conduit in fluid communication with the compressed gas supply so as to receive compressed gas to be dried, a cooler in heat transference contact with the fluid conduit, for reducing a temperature of the compressed gas to be dried, and a liquid drain outlet formed in the fluid conduit at a location downstream of the cooler;
the dryer further including a precooler in heat transference contact with the gas conduit at a location upstream of the cooler, and a liquid line fluidly connecting the liquid drain outlet to the precooler, to supply liquid condensed by way of the reduction in temperature to the precooler, for directly exchanging heat with the compressed gas to be dried, the precooler having a liquid coolant flow path structured to convey a bulk liquid in a counterflow arrangement with a gas coolant flow path, each of the liquid coolant flow path and the gas coolant flow path used to receive heat from the compressed gas.

16. The system of claim 15 wherein the precooler includes a gas-to-gas heat exchange section having the gas coolant flow path, and a gas-to-liquid heat exchange section having a first heat exchange surface exposed to a flow of the compressed gas and a second heat exchange surface exposed to a flow of the liquid supplied via the liquid line, wherein the liquid coolant flow path is defined by the second heat exchange surface.

17. The system of claim 16 wherein the gas-to-liquid heat exchange section is positioned upstream the gas-to-gas heat exchange section.

18. The system of claim 15 further comprising a coolant loop structured to circulate a coolant through the cooler.

19. The system of claim 18 further comprising a liquid-gas separator that includes the liquid drain outlet and a gas outlet, and a gas line extending from the liquid-gas separator to the gas-to-gas heat exchange section of the precooler.

20. The system of claim 19 wherein the fluid conduit includes an upstream segment that extends through the precooler and the cooler, and a downstream segment that includes the gas line.

* * * * *